(12) United States Patent
Todoroff et al.

(10) Patent No.: US 7,492,445 B1
(45) Date of Patent: Feb. 17, 2009

(54) METHOD AND APPARATUS FOR ROBUST VELOCITY PREDICTION

(75) Inventors: Brian Todoroff, San Jose, CA (US); Yansun Xu, Mt. View, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 205 days.

(21) Appl. No.: 11/446,694

(22) Filed: Jun. 5, 2006

(51) Int. Cl.
*G01P 3/36* (2006.01)

(52) U.S. Cl. ......................................... 356/28

(58) Field of Classification Search ....... 356/3.01–3.15, 356/4.01–4.1, 5.01–5.15, 6–22, 28, 28.5, 356/128, 128.5
See application file for complete search history.

(56) References Cited

U.S. PATENT DOCUMENTS

| | | | |
|---|---|---|---|
| 3,922,093 A | 11/1975 | Dandliker et al. | |
| 4,546,347 A | 10/1985 | Kirsch | |
| 4,799,055 A | 1/1989 | Nestler et al. | |
| 5,288,993 A | 2/1994 | Bidiville et al. | |
| 5,345,527 A | 9/1994 | Lebby et al. | |
| 5,473,344 A | 12/1995 | Bacon et al. | |
| 5,578,813 A | 11/1996 | Allen et al. | |
| 5,606,174 A | 2/1997 | Yoshimura et al. | |
| 5,644,139 A | 7/1997 | Allen et al. | |
| D382,550 S | 8/1997 | Kaneko et al. | |
| D385,542 S | 10/1997 | Kaneko et al. | |
| 5,703,356 A | 12/1997 | Bidiville et al. | |
| 5,729,008 A | 3/1998 | Blalock et al. | |
| 5,729,009 A | 3/1998 | Dandliker et al. | |
| 5,781,229 A | 7/1998 | Zediker et al. | |
| 5,786,804 A | 7/1998 | Gordon | |
| 5,825,044 A | 10/1998 | Allen et al. | |
| 5,854,482 A | 12/1998 | Bidiville et al. | |
| 5,907,152 A | 5/1999 | Dandliker et al. | |
| 5,963,197 A | 10/1999 | Bacon et al. | |
| 5,994,710 A | 11/1999 | Knee et al. | |
| 6,031,218 A | 2/2000 | Piot et al. | |
| 6,037,643 A | 3/2000 | Knee | |
| 6,057,540 A | 5/2000 | Gordon et al. | |
| 6,097,371 A | 8/2000 | Siddiqui et al. | |
| 6,151,015 A | 11/2000 | Badyal et al. | |
| 6,172,354 B1 | 1/2001 | Adan et al. | |
| 6,225,617 B1 | 5/2001 | Dandliker et al. | |
| 6,233,368 B1 | 5/2001 | Badyal et al. | |
| 6,281,881 B1 | 8/2001 | Siddiqui et al. | |
| 6,281,882 B1 | 8/2001 | Gordon et al. | |
| 6,326,950 B1 | 12/2001 | Liu | |
| 6,330,057 B1 | 12/2001 | Lederer et al. | |
| 6,351,257 B1 | 2/2002 | Liu | |

(Continued)

*Primary Examiner*—Thomas H Tarcza
*Assistant Examiner*—Luke D Ratcliffe

(57) ABSTRACT

One embodiment relates to a method of velocity prediction using a sensor array. Differential signals are obtained from the sensor array at multiple frame rates. A first velocity prediction is determined from the differential signals at a first frame rate, and a second velocity prediction is determined from the differential signals at a second frame rate. Another embodiment relates to an optical navigation apparatus which includes a sensor array, differential circuitry, driver circuitry, and a signal processing device. The driver circuitry is configured to drive the sensor array and differential circuitry so as to operate at multiple frame rates in an interleaved manner. The signal processing device is configured to compute a first velocity prediction from the differential signals at a first frame rate and to compute a second velocity prediction from the differential signals at a second frame rate. Other embodiments and features are also disclosed.

17 Claims, 4 Drawing Sheets

U.S. PATENT DOCUMENTS

| | | |
|---|---|---|
| 6,396,479 B2 | 5/2002 | Gordon |
| 6,421,045 B1 | 7/2002 | Venkat et al. |
| 6,424,407 B1 | 7/2002 | Kinrot et al. |
| 6,433,780 B1 | 8/2002 | Gordon et al. |
| 6,452,683 B1 | 9/2002 | Kinrot et al. |
| 6,455,840 B1 | 9/2002 | Oliver et al. |
| D464,352 S | 10/2002 | Kerestegian |
| 6,462,330 B1 | 10/2002 | Venkat et al. |
| 6,476,970 B1 | 11/2002 | Smith |
| 6,529,184 B1 | 3/2003 | Julienne |
| 6,585,158 B2 | 7/2003 | Norskog |
| 6,603,111 B2 | 8/2003 | Dietz et al. |
| 6,621,483 B2 | 9/2003 | Wallace et al. |
| 6,642,506 B1 | 11/2003 | Nahum et al. |
| 6,657,184 B2 | 12/2003 | Anderson et al. |
| 6,664,948 B2 | 12/2003 | Crane et al. |
| 6,674,475 B1 | 1/2004 | Anderson |
| 6,677,929 B2 | 1/2004 | Gordon et al. |
| 6,703,599 B1 | 3/2004 | Casebolt et al. |
| 6,737,636 B2 | 5/2004 | Dietz et al. |
| 6,774,351 B2 | 8/2004 | Black |
| 6,774,915 B2 | 8/2004 | Rensberger |
| 6,795,056 B2 | 9/2004 | Norskog et al. |
| 6,809,723 B2 | 10/2004 | Davis |
| 6,819,314 B2 | 11/2004 | Black |
| 6,823,077 B2 | 11/2004 | Dietz et al. |
| 7,298,460 B2 * | 11/2007 | Xu et al. ............... 356/28 |
| 2002/0130835 A1 | 9/2002 | Brosnan |
| 2002/0158300 A1 | 10/2002 | Gee |
| 2002/0190953 A1 | 12/2002 | Gordon et al. |
| 2003/0034959 A1 | 2/2003 | Davis et al. |
| 2003/0058506 A1 | 3/2003 | Green et al. |
| 2003/0142288 A1 | 7/2003 | Kinrot et al. |
| 2004/0046744 A1 * | 3/2004 | Rafii et al. ............... 345/168 |
| 2004/0084610 A1 | 5/2004 | Leong et al. |
| 2004/0189593 A1 | 9/2004 | Koay |
| 2005/0024336 A1 | 2/2005 | Xie et al. |
| 2005/0024623 A1 | 2/2005 | Xie et al. |
| 2005/0083303 A1 | 4/2005 | Schroeder et al. |

* cited by examiner

METHOD AND APPARATUS FOR ROBUST VELOCITY PREDICTION

TECHNICAL FIELD

The present disclosure relates generally to velocity prediction. More particularly, the present disclosure relates to velocity prediction by optical navigation sensors.

BACKGROUND OF THE INVENTION

Velocity prediction may be performed by various device including two-dimensional (2D) optical navigation sensors and other apparatus. Two-dimensional optical navigation sensors include, for example, optical mouse devices for user interface applications. Such optical mouse devices are commonly employed with personal computers.

It is highly desirable to improve methods and apparatus for velocity prediction. It is particularly desirable to improve velocity prediction by two-dimensional optical navigation sensors, such as optical mouse devices.

SUMMARY

One embodiment relates to a method of velocity prediction using a sensor array. Differential signals are obtained from the sensor array at multiple frame rates. A first velocity prediction is determined from the differential signals at a first frame rate, and a second velocity prediction is determined from the differential signals at a second frame rate.

Another embodiment relates to a method of velocity prediction using a two-dimensional (2D) sensor array. Differential signals from the 2D sensor array at multiple frame rates. First and third velocity predictions are determined from the differential signals at a first frame rate, wherein the first and third velocity predictions measure velocity along two orthogonal axes. Second and fourth velocity predictions are determined from the differential signals at a second frame rate, wherein the second and fourth velocity predictions also measure velocity along the two orthogonal axes.

Another embodiment relates to an optical navigation apparatus which includes a sensor array, differential circuitry, driver circuitry, and a signal processing device. The driver circuitry is configured to drive the sensor array and differential circuitry so as to operate at multiple frame rates in an interleaved manner. The signal processing device is configured to compute a first velocity prediction from the differential signals at a first frame rate and to compute a second velocity prediction from the differential signals at a second frame rate.

Other embodiments and features are also disclosed.

BRIEF DESCRIPTION OF THE DRAWINGS

These and various other features and advantages of the present invention may be apparent upon reading of the following detailed description in conjunction with the accompanying drawings and the appended claims provided below.

DETAILED DESCRIPTION

2D Comb Array for Tracking 2D Motion

Figure 1:
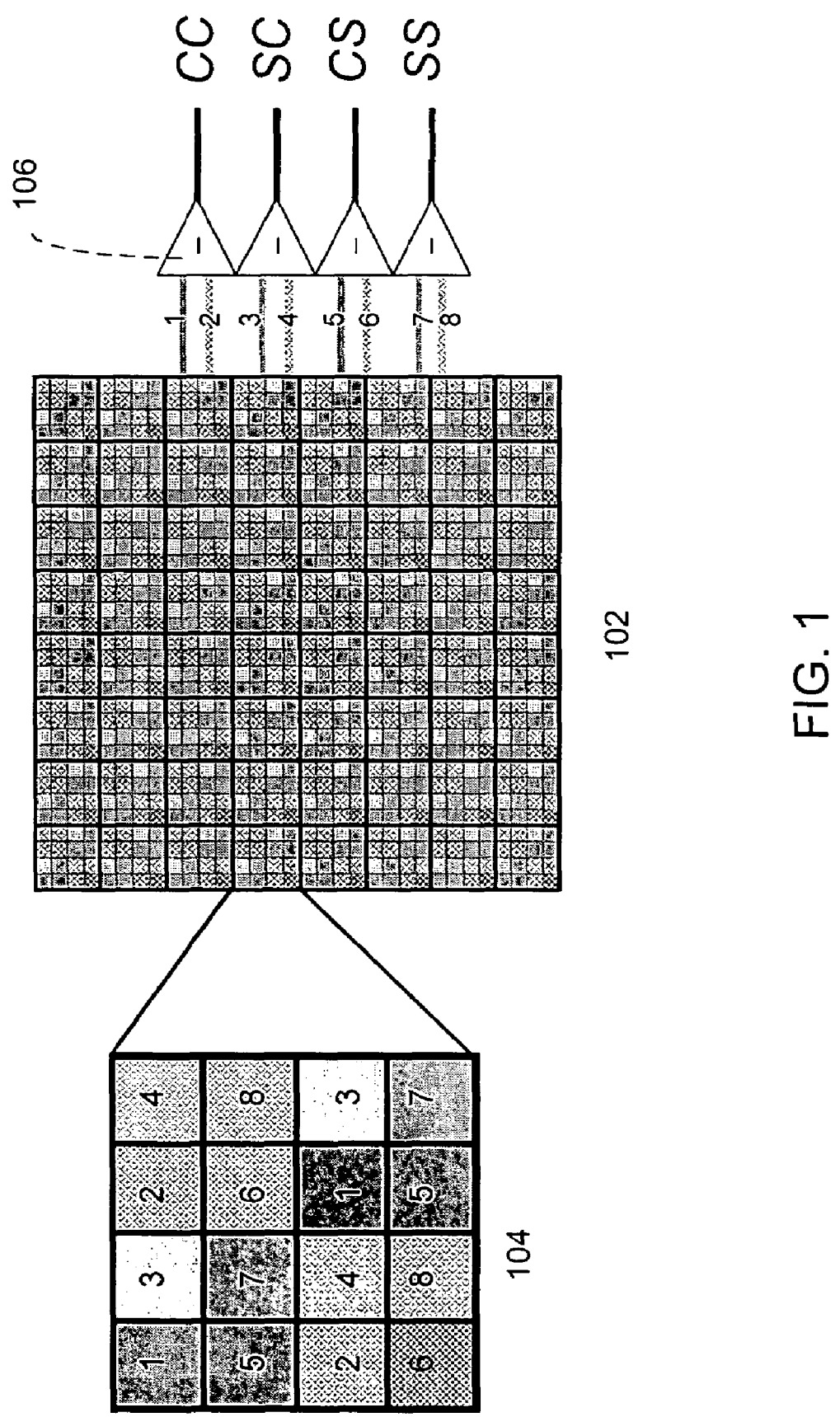
FIG. 1 is a schematic diagram of a two-dimensional comb array for sensing 2D motion in accordance with an embodiment of the invention.

FIG. 1 is a schematic diagram depicting an example 2D comb array 102 for detecting 2D motion in accordance with an embodiment of the invention. Such a 2D comb array may be utilized, for example, in an optical navigation sensor, such as an optical mouse device.

The example 2D array 102 is made up of 36 sub-arrays 104 organized in a 6-by-6 matrix. Of course, the array 102 may be of various matrix sizes, the 6×6 matrix size being shown here for purpose of discussion.

An expanded view of one such sub-array 104 is shown on the left side of the figure. In this example with M=4, each sub-array 104 comprises 16 detector elements or photo-detector cells organized in a 4-by-4 matrix. In other implementations, other values of M may be used to create the sub-arrays.

The 16 detector elements in each sub-array 104 are each identified as being a member of one of eight groups of elements. The group number associated with each detector element of each sub-array 104 is shown by the number (1, 2, 3, 4, 5, 6, 7, or 8) labeling the element in the expanded view. The signals from each group are electrically ganged or wired together for the entire array 102. The resultant group signals (numbered 1 through 8) are output from the array 102 (as shown on the right side of the figure).

Differential circuitry 106 is used to generate differential signals from pairs of the group signals. For this example with M=4, there are four differential outputs from the array (CC, CS, SC, and SS). A first differential signal CC is generated by the difference of signals 1 and 2. A second differential signal SC is generated by the difference of signals 3 and 4. A third differential signal CS is generated by the difference of signals 5 and 6. A fourth differential signal SS is generated by the difference of signals 7 and 8.

The spatial frequency distribution of the image captured on the detector array is approximately centered on the spatial frequency of the detector array. Through the processing of the four quasi-sinusoidal outputs (CC, CS, SC, and SS) representing separate in-phase and quadrature signals for motion along two orthogonal axes, the 2D movement of the surface relative to the detector array may be tracked.

Velocity Prediction Using 2D Comb Array

In accordance with an embodiment of the invention, at each sample frame, phase angle values $\phi_x$ and $\phi_y$, and radius values $R_x$ and $R_y$, may be computed according to the following equations.

$$\phi_x = \tan^{-1}\left(\frac{CS + SC}{CC - SS}\right) \quad \text{(Eqn 1)}$$

$$R_x = \sqrt{(CC - SS)^2 + (CS + SC)^2} \quad \text{(Eqn 2)}$$

$$\phi_y = \tan^{-1}\left(\frac{CS - SC}{CC + SS}\right) \quad \text{(Eqn 3)}$$

$$R_x = \sqrt{(CC + SS)^2 + (CS - SC)^2} \quad \text{(Eqn 4)}$$

$R_x$ and $R_y$ indicate the contrast of the detected quasi-sinusoidal signals. Changes in the phase angles $\phi_x$ and $\phi_y$ from a previous sample frame are indicative of motion along the two orthogonal axes (the x and y axes).

The changes in phase angles from a previous sample frame may be denoted by $\Delta\phi_x$ and $\Delta\phi_y$, and may be computed according to the following equations.

$$\Delta\phi_x = \phi_{x,i1} - \phi_{x,i-1} \text{ where } \phi_{x,i} = \tan^{-1}\left(\frac{CS_i + SC_i}{CC_i - SS_i}\right) \quad \text{(Eqn 5)}$$

$$\Delta\phi_y = \phi_{y,i1} - \phi_{y,i-1} \text{ where } \phi_{y,i} = \tan^{-1}\left(\frac{CS_i - SC_i}{CC_i + SS_i}\right) \quad \text{(Eqn 6)}$$

In the above equations, the current frame is denoted by i, such that phase angles for a current frame are denoted by the subscript i, and the phase angles for the previous frame are denoted by the subscript i−1.

While $\Delta\phi_x$ and $\Delta\phi_y$ are indicative of motion along the x and y axes, they do not completely reflect the actual two-dimensional motion. This is because the values of $\Delta\phi_x$ and $\Delta\phi_y$ are restricted to the range from $-\pi$ to $+\pi$ due to the inverse tangent function. In other words, the values of $\Delta\phi_x$ and $\Delta\phi_y$ are "wrapped" in the range $[-\pi, +\pi]$.

Consider the functions $\Delta\Phi_x$ and $\Delta\Phi_y$ to be "unwrapped" versions of $\Delta\phi_x$ and $\Delta\phi_y$, respectively. Hence, $\Delta\phi_x$ is a modulo function of $\Delta\Phi_x$, and $\Delta\phi_y$ is a modulo function of $\Delta\Phi_y$, where the values of $\Delta\phi_x$ and $\Delta\phi_y$ each "wraps" within the range $[-\pi+\rho]$. $\Delta\Phi_x$ and $\Delta\Phi_y$ are indicative of the actual (unwrapped) motion of the sensor relative to the surface.

Since $\Delta\phi_x$ and $\Delta\phi_y$ are computed from the differential signals output by the 2D comb array, they may be "unwrapped" to determine the functions $\Delta\Phi_x$ and $\Delta\Phi_y$. Such unwrapping of an example function $\Delta\phi(t)$ to generate the corresponding function $\Phi(t)$ is illustrated in FIG. 2.

Figure 2:
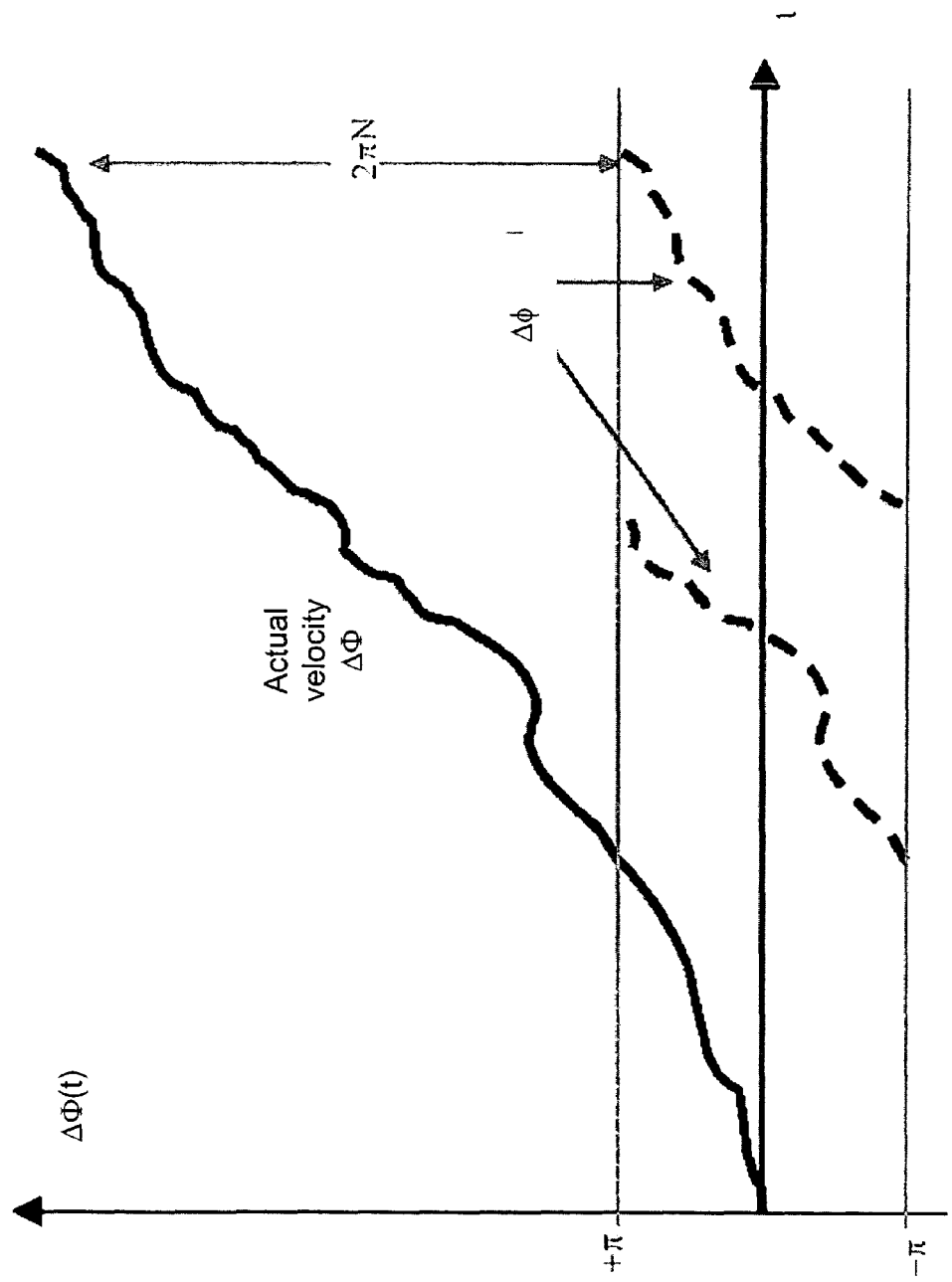
FIG. 2 is a plot showing an example of unwrapping phase angles from inverse tangent calculations so as to determine a velocity predictor.

In FIG. 2, $\Delta\Phi(t)$ is generated assuming an initial condition constraint of $\Delta\Phi(0)=0$. In other words, at t=0, it is assumed that there is no relative motion (i.e. the sensor is at rest relative to the surface).

With this initial assumption, the "actual velocities" $\Delta\Phi_x$ and $\Delta\Phi_y$ may be computed, for example, by tracking the average velocities over the past K frames (where K>2) and assuming that the next velocity with be within $+/-\pi$ of the average velocity. This computation may be implemented according to the following equations.

$$\Delta\Phi_x = \Delta\phi_x - 2\pi \times \text{INTEGER}\left(\frac{\Delta\phi_x - \langle\Delta\Phi_x\rangle + \pi}{2\pi}\right) \quad \text{(Eqn 7)}$$

$$\Delta\Phi_y = \Delta\phi_y - 2\pi \times \text{INTEGER}\left(\frac{\Delta\phi_y - \langle\Delta\Phi_y\rangle + \pi}{2\pi}\right) \quad \text{(Eqn 8)}$$

In the above equations, the INTEGER function takes the largest integer value that is not greater than its argument. $\langle\Delta\Phi_x\rangle$ and $\langle\Delta\Phi_y\rangle$ are the average velocities over the past K frames (K>2) and may be computed according to the following equations.

$$\langle\Delta\Phi_x\rangle = \frac{1}{K}\sum_{j=1}^{K} \Delta\Phi_{x,(i-j)} \quad \text{(Eqn 9)}$$

$$\langle\Delta\Phi_y\rangle = \frac{1}{K}\sum_{j=1}^{K} \Delta\Phi_{y,(i-j)} \quad \text{(Eqn 10)}$$

$\langle\Delta\Phi_x\rangle$ and $\langle\Delta\Phi_y\rangle$ are utilized within the INTEGER functions so as to track the number of "$2\pi$" rotations that have occurred within a frame.

The above-described algorithm needs to assume that the initial velocity is known in order to work. Specifically, the algorithm assumes that the initial velocity is close to zero such that the sensor is at rest with respect to the surface.

Problems and Drawbacks with the Above-Described Technique

The above-described technique has substantial problems and drawbacks.

First, the above-described technique does not determine an absolute velocity, and so it relies on the assumption that the sensor begins at some known velocity (typically, at rest). However, this assumption may be violated. In the example of an optical mouse device, the mouse device may be brought close to the tracking surface at a non-zero initial velocity. In other words, the user's hand may be moving as he/she brings the mouse device to the tracking surface.

If the initial condition assumed is in error, then the velocity predictor technique described above would not detect the error, and furthermore may not readily recover from the error.

For simplicity of discussion, consider the motion in one of the two dimensions. For example, if the motion starts from rest ($\Delta\Phi=0\pi$/frame), then accelerates to a speed of $\Delta\Phi=3\pi$/frame, then decelerates back to rest, the velocity predictor technique described above would work as intended.

However, if the motion starts at $2\pi$/frame, then accelerates to $3\pi$/frame, and then decelerates to rest, then the velocity predictor technique described above would give erroneous results. The velocity prediction error occurs because the initial $2\pi$/frame speed results in a same result from the inverse tangent function as an initial speed of zero (or $4\pi$/frame for that matter). As such, the velocity predictor algorithm erroneously assumes that its starting condition is at rest ($\Delta\Phi=0\pi$/frame). When the motion accelerates to $3\pi$/frame, the velocity predictor algorithm give an erroneous speed of only $\pi$/frame. When the motion decelerates to a resting state (zero velocity), the velocity predictor algorithm give an erroneous speed of $-2\pi$/frame. In other words, the velocity predictor algorithm continues to report a motion with a negative $2\pi$/frame velocity offset from the actual motion.

Other problems may occur due to under-sampling of the motion with a frame rate which is too low compared with the motion. For example, the determination of the average velocities $\langle\Delta\Phi_x\rangle$ and $\langle\Delta\Phi_y\rangle$ may be erroneous due to such under-sampling.

Robust Velocity Prediction Using 2D Comb Array

The present disclosure provides methods and apparatus to achieve a robust velocity prediction using a 2D comb array.

In accordance with an embodiment of the invention, a robust velocity prediction may be achieved by utilizing a technique where the sensor alternates between two frame rates. The two frame rates are such that they have a non-integer ratio. In other words, neither frame rate is an integer multiple of the other.

This technique is now discussed in relation to a specific example. In this example, consider the first frame rate for even frames to be $1/\Delta t_0$ and the second frame rate for odd frames to be $1/\Delta t_1$. Further, consider that $\Delta t_1/\Delta t_0=r$, where r is a non-integer number. The non-integer ratio may be selected depending on the specific application.

Consider the problematic example discussed above where the motion along one dimension starts at $2\pi$/frame, then accelerates to $3\pi$/frame, and then decelerates to rest or $0\pi$/frame. As previously discussed, the single frame rate technique described above would give an erroneous velocity prediction.

Now, consider application of the two-frame-rate technique, where r=0.9, for example. When the motion in the one dimension is actually at rest or $0\pi$/frame, the base sample rate would measure a velocity of $-2\pi$/frame. However, the slower sample rate which is 90% of the base rate would measure a velocity of $-1.87\pi$/frame. This difference between the two velocity measurements indicates that the velocity derived from the base sample rate is incorrect. Correcting the velocity prediction then becomes a matter of determining the nearest velocity that provides a $\Delta\Phi=0\pi$/frame measurement at both frame rates and predicted velocity accordingly. In this case, $0\pi$/frame is the nearest velocity, followed by $+/-20\pi$/frame. Hence, the true velocity is determined to be $0\pi$/frame. Note that, in this example, the technique would break down at $+/-20\pi$/frame for an initial condition. So, preferably such an initial condition would be beyond the conditions expected to be encountered for the particular application. The following is a more detailed discussion of this technique.

Figure 3:
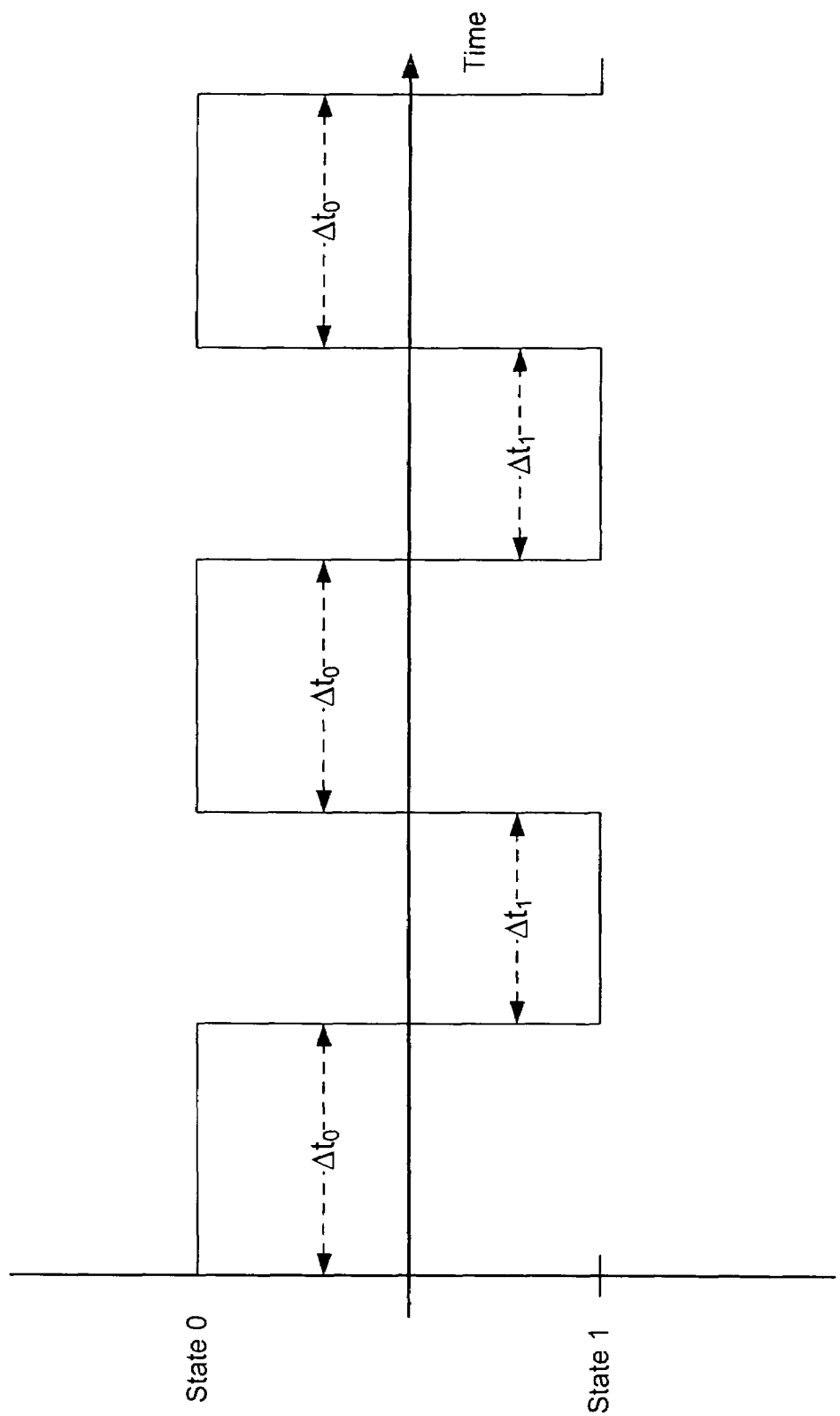
FIG. 3 shows an example timing diagram which switches between a first state to collect signal data for the even frames and a second state to collect signal data for the odd frames in accordance with an embodiment of the invention.

FIG. 3 shows an example timing diagram which switches between a first state (State 0) to collect signal data for the even frames and a second state (State 1) to collect signal data for the odd frames in accordance with an embodiment of the invention. As seen, each even frame is collected over a time period of $\Delta t_0$, and each odd frame is collected over a time period of $\Delta t_1$. In others, frames of width $\Delta t_0$, and frames of width $\Delta t_1$ are interleaved.

The differential signals obtained from the comb array during even frames (State 0) are utilized to compute a first velocity estimation $V_0$, while the differential signals obtained from the comb array during odd frames (State 1) are utilized to compute a second velocity estimation $V_1$. These computations may be implemented according to the following equations.

$$V_0 = \frac{\langle\Delta\Phi\rangle_0}{\Delta t_0} = \frac{2}{K \times \Delta t_0} \sum_{j=1}^{K/2} \Delta\Phi_{(i-2\times j)} \quad \text{(Eqn 11)}$$

$$\Delta\Phi_{(i-2\times j)} \Delta\phi_{(i-2\times j)} - 2\pi \times \text{INTEGER}\left(\frac{\Delta\phi_{(i-2\times j)} - \langle\Delta\Phi\rangle_0 + \pi}{2\pi}\right) \quad \text{(Eqn 12)}$$

$$V_1 = \frac{\langle\Delta\Phi\rangle_1}{\Delta t_1} = \frac{2}{K \times \Delta t_1} \sum_{j=1}^{K/2} \Delta\Phi_{(i-2\times j+1)} \quad \text{(Eqn 13)}$$

$$\Delta\Phi_{(i-2\times j)+1} = \quad \text{(Eqn 14)}$$
$$\Delta\phi_{(i-2\times j+1)} - 2\pi \times \text{INTEGER}\left(\frac{\Delta\phi_{(i-2\times j+1)} - \langle\Delta\Phi\rangle_1 + \pi}{2\pi}\right)$$

In the above equations, the current frame is denoted by i, and K is an even number and is greater than 2. $\langle\Delta\Phi\rangle_0$ is the average change in phase over the prior K/2 even frames, and $\langle\Delta\Phi\rangle_1$ is the average change in phase over the prior K/2 odd frames.

Ideally, $V_0$ should equal to $V_1$, such that the following equation is satisfied.

$$\frac{\langle\Delta\Phi\rangle_1}{\langle\Delta\Phi\rangle_0} = \frac{\Delta t_1}{\Delta t_0} = r \quad \text{(Eqn 15)}$$

However, the above ideal equation (Eqn 15) is not necessarily satisfied because there may be extra or missing $2\pi$ "rotations" in $\langle\Delta\Phi\rangle_0$ as a result of the initial condition assumption and/or under-sampling or other reasons.

In accordance with a first embodiment, it is assumed that a faster frame rate yields a more accurate velocity estimation. In a first case, the second frame rate (for odd frames) is set to be faster than the first frame rate (for even frames). In other words, $\Delta t_1 < \Delta t_0$, or $0 \leq r \leq 1$. In this case, the velocity estimation based on the odd frames (i.e. $\langle\Delta\Phi\rangle$) is assumed to be the more accurate velocity estimation. In a second case, the first frame rate (for even frames) is set to be faster than the second frame rate (for odd frames). In other words, $\Delta t_0 < \Delta t_1$, or $r > 1$. In this case, the velocity estimation based on the even frames (i.e. $\langle\Delta\Phi\rangle_0$) is assumed to be the more accurate velocity estimation.

The extra or missing $2\pi$ "rotations" in the velocity estimation based on the slower frame rate may be determined and accounted for as follows. For example, consider the case where the second frame rate (for odd frames) is set to be faster than the first frame rate (for even frames). A new or corrected value of $\langle\Delta\Phi\rangle_0$ may be denoted $(\langle\Delta\Phi\rangle_0)_{new}$. $(\langle\Delta\Phi\rangle_0)_{new}$ satisfies the following equations.

$$(\langle\Delta\Phi\rangle_0)_{new} = \langle\Delta\Phi\rangle_0 + 2\pi \times N_0 \quad \text{(Eqn 16)}$$

$$(\langle\Delta\Phi\rangle_0)_{new} \times r = \langle\Delta\Phi\rangle \quad \text{(Eqn 17)}$$

where $N_0$ is the number of missing $2\pi$ rotations in $\langle\Delta\Phi\rangle_0$ in comparison to $\langle\Delta\Phi\rangle_1$. Substituting for $N_0$ in the first equation above (Eqn 16) gives the following equation for computing $(\langle\Delta\Phi\rangle_0)_{new}$.

$$(\langle\Delta\Phi\rangle_0)_{new} = \langle\Delta\Phi\rangle_0 + 2\pi \times \text{INTEGER}\left(\frac{\langle\Delta\Phi\rangle_1 - \langle\Delta\Phi\rangle_0 \times r}{2\pi \times r}\right) \quad \text{(Eqn 18)}$$

In the above equation (Eqn 18), the INTEGER function takes the largest integer value that is not greater than its argument. As calculated according to the above equation (Eqn 18), the function $(\langle\Delta\Phi\rangle_0)_{new}$ becomes a velocity estimation which is corrected for extra or missing phase rotations.

In accordance with a second embodiment, the absolute values of the two velocity estimations (under the two different frame rates) are compared. This technique then assumes the one with the smaller absolute value (i.e. the one with the slower speed) is the accurate velocity estimation. This second approach may be particularly advantageous in overcoming the "run-away" problem in comb array based position tracking due to over-estimation of the velocity predictor with extra phase rotations.

If the velocity estimation based on odd frames (i.e. $\langle\Delta\Phi\rangle_1$) has the smaller absolute value, then $\langle\Delta\Phi\rangle_1$ is assumed to be accurate and the above equation (Eqn 18) may be utilized to correct the velocity estimation for the even frames. On the other hand, if the velocity estimation based on even frames (i.e. $\langle\Delta\Phi\rangle_0$) has the smaller absolute value, then $\langle\Delta\Phi\rangle_0$ is assumed to be accurate and the below equation (Eqn 19) may be utilized to correct the velocity estimation for the odd frames.

$$(\langle\Delta\Phi\rangle_1)_{new} = \langle\Delta\Phi\rangle_1 + 2\pi \times \text{INTEGER}\left(\frac{\langle\Delta\Phi\rangle_0 \times r - \langle\Delta\Phi\rangle_1}{2\pi}\right) \quad \text{(Eqn 19)}$$

where the new or corrected value of $\langle\Delta\Phi\rangle_1$ is denoted $(\langle\Delta\Phi\rangle_1)_{new}$.

In accordance with a third embodiment, a single velocity predictor value is estimated by mixing the delta-phases from both frame rates into a single average velocity V. This technique assumes that some of the initial condition constraint errors or other estimation errors may be removed or mitigated by this mixed averaging. The average velocity V may be determined using the equations below.

$$V = \frac{1}{K}\sum_{j=1}^{K/2}\left[\frac{\Delta\Phi_{(i-2\times j)}}{\Delta t_0} + \frac{\Delta\Phi_{(j-2\times j+1)}}{\Delta t_1}\right] \quad \text{(Eqn 20)}$$

The averaging of this approach may be implemented with less logic than the prior two approaches.

Note that for 2D position tracking, one of the above three approaches would be performed along each of the two orthogonal directions. Also, note that while the above descriptions discusses velocities in terms of changes in phase (i.e. phase velocities), these phase velocities correspond to linear velocities, where the conversion between the two depend upon the dimensions and geometries of the specific apparatus.

In the above three approaches, the ratio r of the two frame rates is preferably selected to allow the entire range of anticipated velocities to be discriminated without requiring resolution beyond the capabilities of the measurement system.

While the technique described above uses two frame rates, other embodiments may utilize three or more frame rates. For example, under the third approach, the delta-phases from the three or more frame rates may be averaged to compute the single average velocity V.

The above-described technique for tracking 2D motion using a 2D comb detector array may be advantageously implemented so as to require less signal processing power than existing techniques. Such lower power consumption may be particularly suitable for power-sensitive applications, such as, for example, wireless mouse devices.

Figure 4:
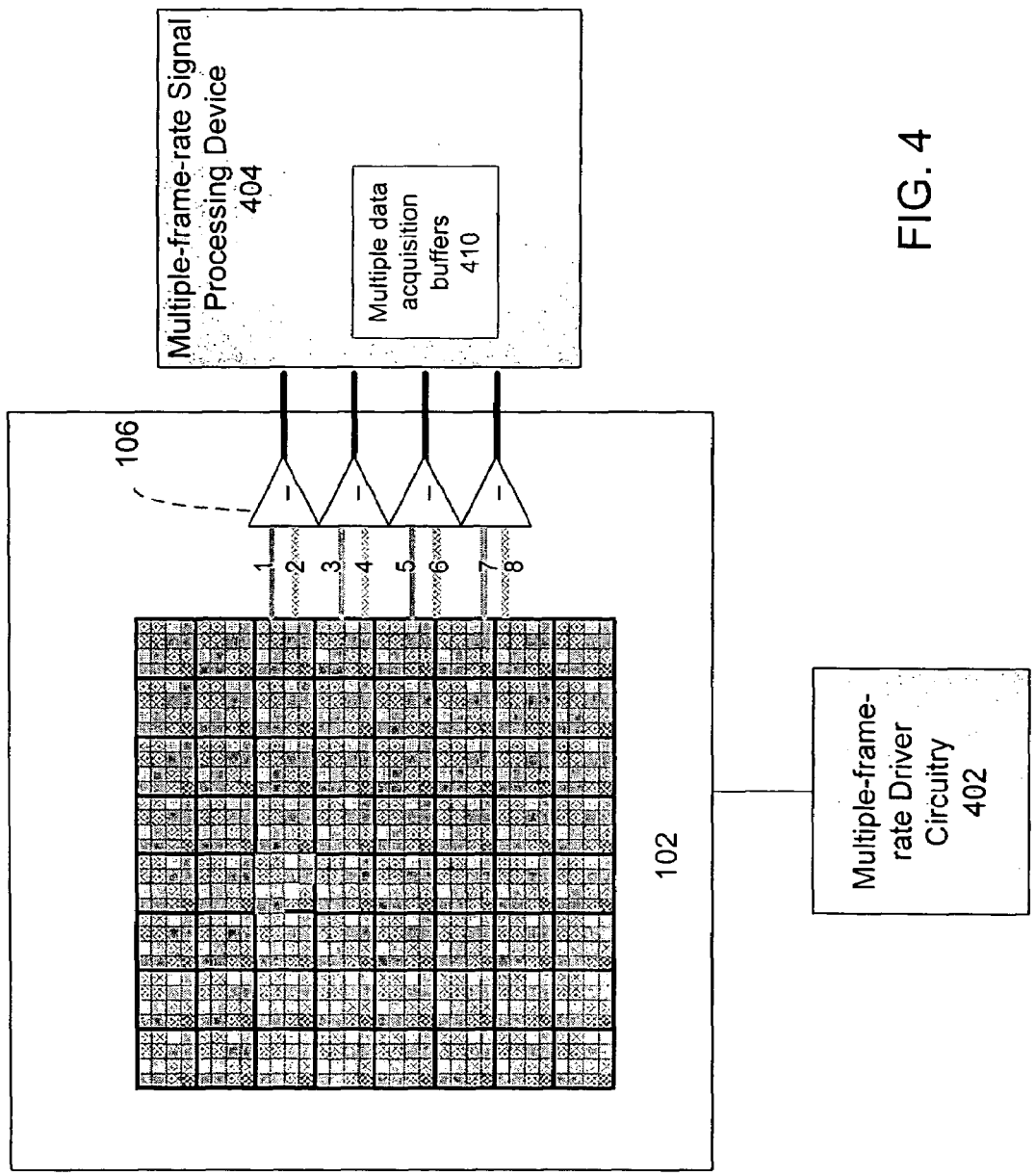
FIG. 4 is a schematic diagram showing an apparatus for robust velocity prediction in accordance with an embodiment of the invention.

FIG. 4 is a schematic diagram showing an apparatus for robust velocity prediction in accordance with an embodiment of the invention. The apparatus includes a 2D comb detector array 102 and differential circuitry 106 as discussed above in FIG. 1. The apparatus further includes multiple-frame-rate driver circuitry 402 and a signal processing device 404 configured to process the multiple-frame-rate data.

The driver circuitry 402 is configured to provide a timing signals so as to drive the 2D comb detector array 102 and differential circuitry 106 at two (or more) frame rates, where frames at one rate are interleaved with frames from the other rate.

The signal processing device 404 is configured to receive the differential signals at the multiple frame rates from the differential circuitry 106 and to process those signals to generate a robust 2D velocity prediction. The robust 2D velocity prediction may be implemented using the multiple frame rate technique discussed above. In one implementation, the signal processing device 404 may include two (or more) buffers 410, each buffer being configured to hold data associated with a particular frame rate of image acquisition.

The signal processing device 404 may be implemented with hardware signal processing circuitry and/or a combination of hardware and software. In the case of the hardware/software combination, the software comprises processor-executable instructions to perform at least a portion of the technique.

The foregoing description of specific embodiments and examples of the invention have been presented for the purpose of illustration and description, and although the invention has been described and illustrated by certain of the preceding examples, it is not to be construed as being limited thereby. They are not intended to be exhaustive or to limit the invention to the precise forms disclosed, and many modifications, improvements and variations within the scope of the invention are possible in light of the above teaching. It is intended that the scope of the invention encompass the generic area as herein disclosed, and by the claims appended hereto and their equivalents.

What is claimed is:

1. A method of velocity prediction using a sensor array, the method comprising:
obtaining differential signals from the sensor array at multiple frame rates;
determining a first velocity prediction from the differential signals at a first frame rate; and
determining a second velocity prediction from the differential signals at a second frame rate; and
processing the first and second velocity predictions so as to derive a correction for extra or missing phase rotations, wherein a velocity prediction from the faster of the first and second frame rates is utilized to correct a velocity prediction from the slower of the first and second frame rates.

2. The method of claim 1, wherein the sensor array comprises an array of detector cells configured as a comb array.

3. The method of claim 1, wherein the first frame rate is $1/\Delta t_0$, the second frame rate is $1/\Delta t_1$, and the sensor array obtains the differential signals at the two frame rates by interleaving frames of width $\Delta t_0$ and frames of width $\Delta t_1$.

4. The method of claim 3, wherein the ratio of the first frame rate to the second frame rate is a non-integer number.

5. A method of velocity prediction using a sensor array, the method comprising:
obtaining differential signals from the sensor array at multiple frame rates;
determining a first velocity prediction from the differential signals at a first frame rate; and
determining a second velocity prediction from the differential signals at a second frame rate; and
processing the first and second velocity predictions so as to derive a correction for extra or missing phase rotations, wherein a slower velocity prediction of the first and second velocity predictions is utilized to correct a faster velocity prediction of the first and second velocity predictions.

6. The method of claim 1, further comprising:
averaging velocity predictions from the multiple frame rates so as to determine an average velocity prediction.

7. The method of claim 1, further comprising:
a third velocity prediction from the differential signals at the first frame rate, wherein the first and third velocity predictions measure velocity along two orthogonal axes; and
determining a fourth velocity prediction from the differential signals at the second frame rate, wherein the second and fourth velocity predictions also measure velocity along the two orthogonal axes.

8. The method of claim 7, wherein the 2D sensor array comprises an array of detector cells configured as a 2D comb array.

9. The method of claim 7, wherein the first frame rate is $1/\Delta t_0$, the second frame rate is $1/\Delta t_1$, and the sensor array obtains the differential signals at the two frame rates by interleaving frames of width $\Delta t_0$ and frames of width $\Delta t_1$.

10. The method of claim 9, wherein the ratio of the first frame rate to the second frame rate is a non-integer number.

11. The method of claim 7, wherein said processing of the first and second velocity predictions corrects extra or missing phase rotations along a first axis, and further comprising:
    processing the third and fourth velocity predictions so as to derive a correction for extra or missing phase rotations along a second axis.

12. The method of claim 7, further comprising:
    averaging the first and second velocity predictions so as to determine a first average velocity prediction along a first axis; and
    averaging the third and fourth velocity predictions so as to determine a second average velocity prediction along a second axis.

13. An optical navigation apparatus, the apparatus comprising:
    a sensor array configured to generate multiple output signals based on optical signals detected by groups of detector elements in the array;
    differential circuitry configured to receive the multiple output signals and to generate differential signals;
    driver circuitry configured to drive the sensor array and differential circuitry so as to operate at multiple frame rates in an interleaved manner; and
    a signal processing device configured to compute a first velocity prediction from the differential signals at a first frame rate and to compute a second velocity prediction from the differential signals at a second frame rate,
    wherein the sensor array comprises a two-dimensional comb array,
    wherein the signal processing device is further configured to compute a third velocity prediction from the differential signals at a first frame rate and to compute a fourth velocity prediction from the differential signals at a second frame rate, and
    wherein the first and second velocity predictions measure motion alone a first axis and the third and fourth velocity predictions measure motion alone a second axis which is orthogonal to the first axis.

14. The apparatus of claim 13, wherein the first frame rate is $1/\Delta t_0$, the second frame rate is $1/\Delta t_1$, and the sensor array obtains the differential signals at the two frame rates by interleaving frames of width $\Delta t_0$ and frames of width $\Delta t_1$.

15. The apparatus of claim 14, wherein the ratio of the first frame rate to the second frame rate is a non-integer number.

16. The apparatus of claim 13, wherein the signal processing device is further configured to process the first and second velocity predictions so as to derive a correction for extra or missing phase rotations.

17. The apparatus of claim 13, wherein the signal processing device is further configured to average velocity predictions from the multiple frame rates so as to determine an average velocity prediction.

* * * * *